United States Patent [19]
Munday

[11] Patent Number: 5,279,260
[45] Date of Patent: Jan. 18, 1994

[54] WATER FUELLED BOILER

[76] Inventor: John F. Munday, General Delivery, Shediac Bridge, New Brunswick, Canada, F0A 3H0

[21] Appl. No.: 886,940

[22] Filed: May 22, 1992

[51] Int. Cl.$^5$ .............................................. C10J 1/00
[52] U.S. Cl. .......................................... 122/5; 48/65; 122/1 R; 122/4 R; 123/3; 204/258; 204/278
[58] Field of Search ................. 122/4 R, 1 R, 5, 13.1, 122/21, 23; 204/278, 258; 48/65; 431/2; 123/3

[56] References Cited

U.S. PATENT DOCUMENTS 3,967,589 7/1976 Papineau ............................. 122/4 R
5,159,900 11/1992 Dammann ............................. 123/3

Primary Examiner—Edward G. Favors
Attorney, Agent, or Firm—John B. Dickman, III

[57] ABSTRACT

A water to fuel electrolysis system for providing hydrogen and oxygen gases to a steam boiler for the production of heat and steam.

9 Claims, 3 Drawing Sheets

WATER FUELLED BOILER

BACKGROUND OF THE INVENTION

The present invention relates to a steam boiler which uses electrolysis to convert water to high pressure steam.

Steam boilers are well known in the prior art. For years they have been operated by petroleum fuels such as kerosene, light oils, and natural gases. Wood and coal are other sources of fuel for steam boilers. Environmentally, it is destructive to continue to burn petroleum fuels other than natural gas, since they pollute the atmosphere. The use of coal puts sulfur and other compounds into the atmosphere. In addition, it is wasteful to use wood and petroleum as fuels, as there are many more useful products that these products can be used to produce, such as plastics, wooden articles, and the like.

Prior art known to applicant is as follows; U.S. Pat. Nos. 583,104 issued to WATTLES, 2,365,330 issued to CARMICHAEL, 2,496,632 issued to FRAGALES, 3,648,668 issued to PACHECO, 4,009,006 issued to HREKA, 4,023,545 issued to MOSHER.

In general, these patents disclose separating hydrogen and oxygen from water by electrolysis and pumping the gases into an internal combustion engine where the gases are compressed and ignited. An electrical spark ignites the hydrogen and oxygen gases to operate the engine.

The present invention does not operate an internal combustion engine, it does drive steam engines, turbines and similar steam operated equipment. The electrolysis of water is similar to the copending application Ser. No. 07/854,079 filed Mar. 19, 1992 now U.S. Pat. No. 5,196,104 however there are distinct differences which will be brought out in the drawings, description and claims.

SUMMARY OF THE INVENTION

The present invention has for its primary object to provide an improved hydrogen and oxygen gases production system by electrolysis of water for producing steam to operate steam engines, turbines and equipment.

In one embodiment a domestic steam boiler for heating a home employs an electrolysis tank equipped with partitions separating anodes and cathodes and a water fill tube. Hydrogen and oxygen gases separated by electrolysis collect above the level of the partitions where they are ignited by an electrical charge to produce high pressure steam. Heat from the steam is used to heat a house.

In another embodiment the steam is used to operate a steam engine or turbine.

A third embodiment is directed to a steam boiler that receives heat from the burning of hydrogen and oxygen gases. An electrolysis tank produces the gases from the conversion of water. Water in the boiler is heated by the burning gases and is converted to steam to run steam engines and turbines. In this embodiment the produced hydrogen and oxygen are separated until they reach a fire box where they are united and burned.

DESCRIPTION OF THE INVENTION

Figure 1:
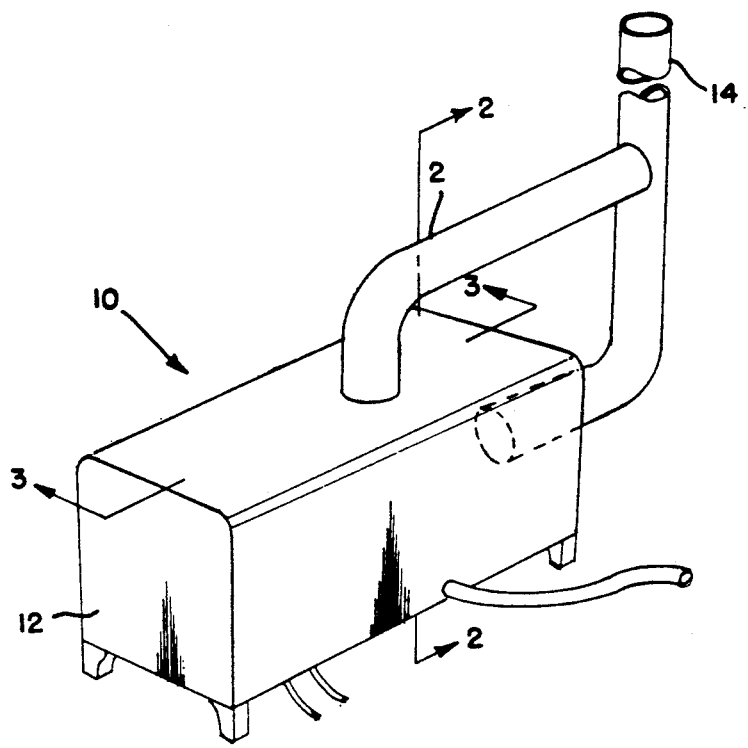
FIG. 1 is a perspective view of a boiler apparatus of the invention.
Figure 2:
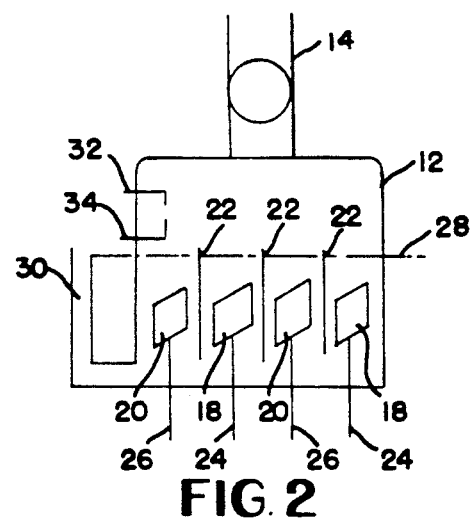
FIG. 2 is a cross-sectional view taken along the line 2—2 of FIG. 1.
Figure 3:
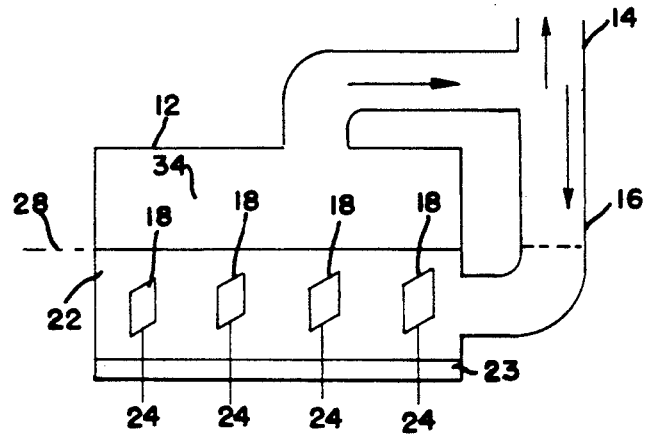
FIG. 3 is a cross-sectional view taken along the line 3—3 of FIG. 1.
Figure 4:
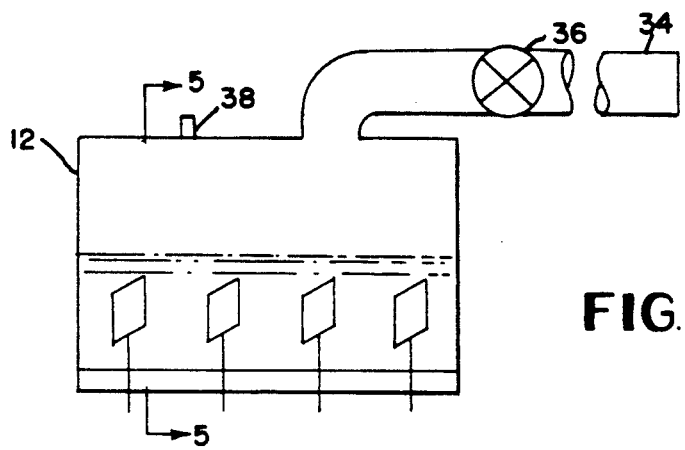
FIG. 4 is another embodiment of the invention showing in cross-section a boiler for driving a steam engine or turbine.
Figure 5:
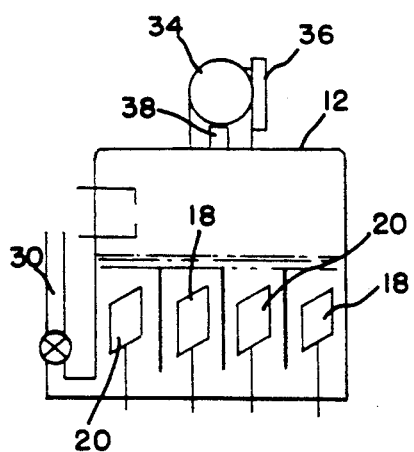
FIG. 5 is a cross-sectional view taken along the line 5—5 of FIG. 4.
Figure 6:
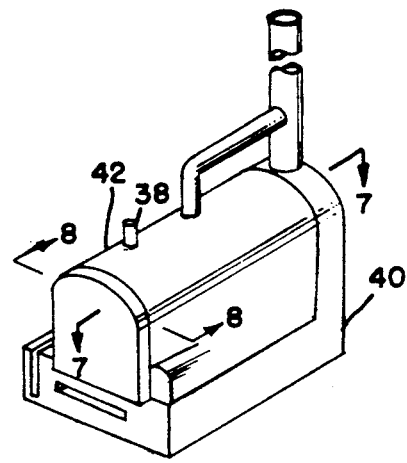
FIG. 6 is a perspective of a third embodiment of a boiler apparatus of the invention.
Figure 7:
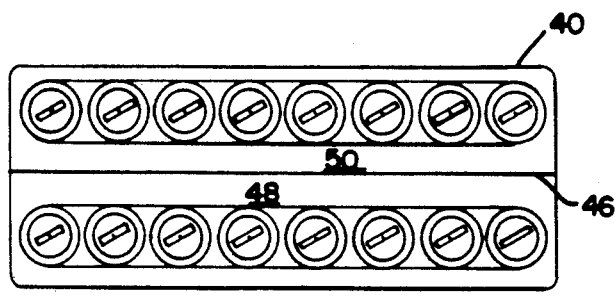
FIG. 7 is a cross-sectional view taken along the line 7—7 of FIG. 6.

Referring to the drawings, there is shown in FIGS. 1-9 a hydrogen-oxygen fuel system and boiler apparatus for producing steam. FIGS. 1-3 show a combination electrolysis unit 8 for producing hydrogen and oxygen gases from water and steam boiler 10 for producing steam. The combination electrolysis and boiler apparatus 10, FIG. 1 are contained in a housing 12 having chimney 14 connected to the top of the housing. A condensation pipe 16 for returning recovered water vapor to the combination electrolysis and boiler apparatus 10 is connected to the bottom of the chimney pipe 14.

FIG. 2 shows anodes 20 and cathodes 18 in alternating lines separated by partitions 22. Electrical leads 24 and 26 connected to anodes 20 and cathodes 18, respectively, protrude from the bottom of housing 12 and connect to a source of d.c. current, not shown. Partitions 22 extend above the water line 28 to block and separate the anodes and cathodes. The bottoms of the partitions 22 do not extend to the bottom of the housing thereby leaving a gap 23 so that water can fill the housing up to near the tops of the partitions 22. A water fill tube 30 provides an inlet for replacement water. High voltage igniter 32 produces an electrical spark above the water-line 28 to ignite the hydrogen and oxygen gases.

In FIG. 3 chimney 14 is shown connected to the top of housing 12. The condensation pipe 16 is a continuation of chimney 14 and connects to the end of the housing below the water level. Partitions 22 are mounted with the partition at or above the water line and leaving a gap at the bottom. The water levels in housing 10 and in condensation pipe 16 are at the same level; therefore, so that the water height does not overflow the tops of partitions 22. Water fill tube 30 has a controller (not shown) to add enough water to fill just below the top of the partitions. Anodes 20 are suspended between the housing walls and/or partitions 22 so that they are submerged in water. Cathodes 18 are also submerged in the water. When the high voltage spark igniter 32 is charged, the hydrogen and oxygen gases present above the water line are ignited producing heat and steam.

The combination electrolysis and boiler apparatus 10 can be used to provide heat to a building or as in FIG'S. 4 and 5, to drive a steam engine or turbine. When used to drive a steam engine or turbine the chimney 14 and condensation pipe 16 are replaced by a high pressure pipe 34 and a steam valve 36. The high pressure pipe 34 connects to either an engine or turbine, not shown, to provide power. Steam valve 36 opens when the pressure reaches a determined P.S.I. to drive the engine or turbine. Should the pressure exceed the rated P.S.I. for the housing 12 a safety valve 38 opens to relieve excess pressure.

Turning to FIGS. 6-9 there is shown an electrolysis apparatus 40 for converting water to hydrogen and oxygen gases and a steam boiler 42 for producing steam. The electrolysis apparatus 40 is best shown in FIG'S. 7 and 8 and includes a water tank 44 with a partition 46 separating it into two containers 48 and 50. The containers are connected together to allow the free flow of water below the partition 46. A plurality of cathodes 52 are mounted in container 48, and anodes 54 are mounted in container 50. When electric current is applied to the cathodes and anodes electrolysis takes place, separating hydrogen and oxygen gases from water. Hydrogen gas which is produced in container 48 leaves the electrolysis apparatus through a manifold 56, and oxygen produced in container 50 exits through manifold 58. Manifolds 56 and 58 are connected to steam boiler fire box 60 where the gases commingle and are ignited to produce heat and steam.

Figure 8:
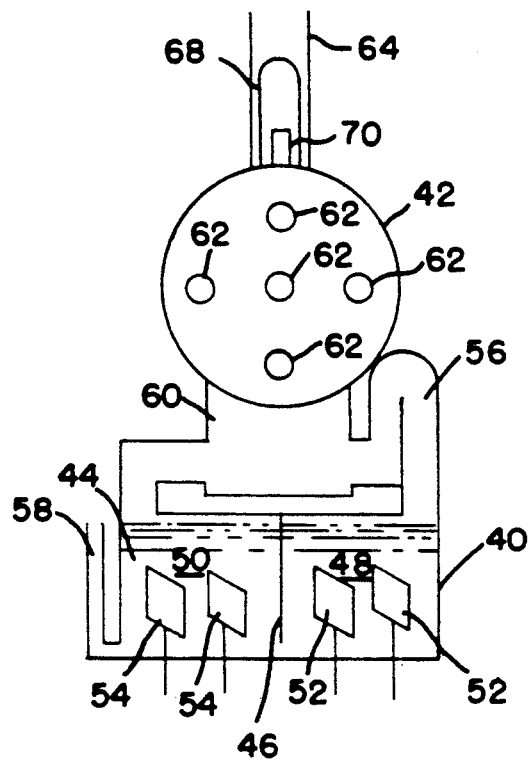
FIG. 8 is a cross-sectional view taken along the line 8—8 of FIG. 6.

FIG. 8 shows the hydrogen manifold 56 has an inverted U-shape that serves as a fire eliminator to stop hydrogen gas from escaping from the fire box 60 and burning in the manifold. The hydrogen and oxygen gases cannot burn separately, therefore, when the two gases come together the burning will be confined to fire box 60, allowing the heat and pressure from combustion to build up to the specified working values.

The fire box 60 is an integral part of steam boiler 42 and is positioned at one end of the boiler. Heat and pressure produced from the ignition of the gases rise in the fire box 60 and pass through heat exchange tubes 62 to chimney 64. As the heat passes through tubes 62, the tubes are heated, and by convection, water in a boiler water chamber 66 is heated, producing high pressure steam. Leading from boiler water chamber 66 is a steam pipe 68 which connects to a steam engine or turbine, not shown. There is a safety valve 70 on the steam boiler 42 and a second valve 72 on the steam pipe 68.

Figure 9:
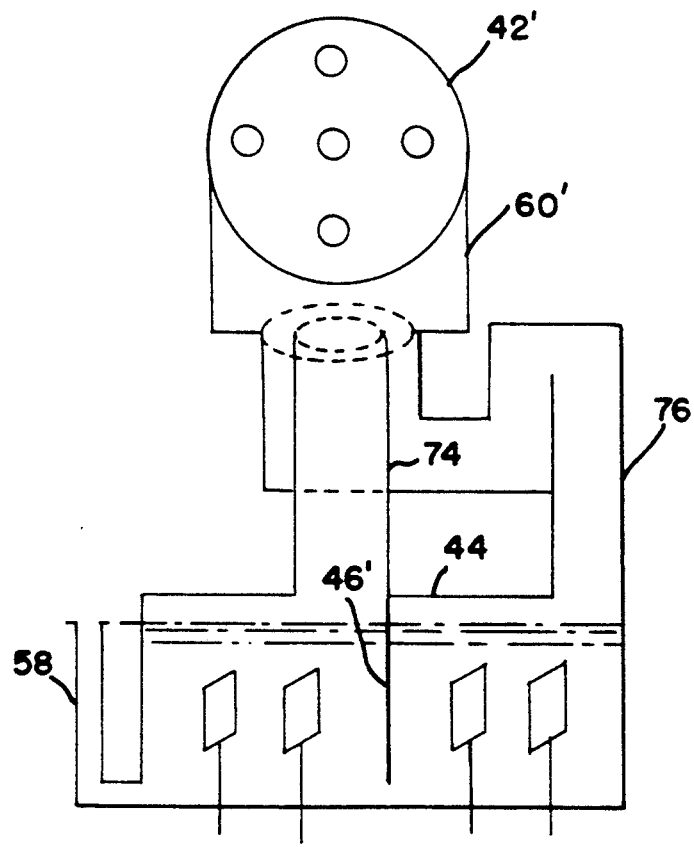
FIG. 9 is a cross-sectional view of a fourth embodiment of the invention.

In the embodiment of FIG. 9, the manifolds have been modified. Oxygen manifold 74 extends from the electrolysis apparatus 44 to fire box 60, and hydrogen manifold 76 has an inverted U-shape 78 which connects to the fire box. The oxygen manifold 74 is surrounded by the hydrogen manifold 76 where the manifolds enter the fire box 60, leading to more efficient mixing of the gases, and resulting in more complete combustion. By making the diameter of the oxygen manifold "d" and the diameter of the hydrogen manifold is $(\sqrt{3})xd$, making the area of the hydrogen manifold twice the area of the oxygen manifold. Hence the ratio of 2:1 will automatically be taken care of during the electrolysis process, making for more complete combustion.

In practice, the electrolysis apparatus is filled with water, covering the anodes and cathodes up to the top edges of the partitions. Electricity is applied to the anodes and cathodes, using a transformer and rectifier to obtain a suitable D. C. voltage. Hydrogen gas is separated by the cathodes and oxygen gas by the anodes. The manufactured gases leave the electrolysis apparatus through manifolds to a steam boiler where an electric spark ignites the commingled gases to produce high pressure steam which can be used for several purposes.

While various embodiments of the invention have been disclosed it is understood that those skilled in the art may realize other embodiments, therefore it is important that one should study the drawings, description and claims for a complete understanding of the invention.

I claim:

1. A water to fuel production system for providing fuel for steam operated devices and a source of heat comprising:
    a. a fuel production means having at least one container separated by partition means into an even number of smaller compartment means, where said smaller compartment means are interconnected by a channel means along the bottom edges of said partition means,
    b. a plurality of anodes and cathodes mounted in said smaller compartment means, providing alternate rows of anodes and cathodes, whereby said anodes and cathodes are provided with d. c. current to produce hydrogen and oxygen gases,
    c. said container having a combustion chamber for collecting and igniting hydrogen and oxygen gases produced in said smaller compartments, and
    d. outlet means connected to said combustion chamber for removing the steam and heat produced during the ignition of hydrogen and oxygen gases from said combustion chamber, whereby the removed heat and steam are used to run steam operated devices including a steam generator or a steam turbine and as a heat source for a boiler.

2. A water to fuel production system as in claim 1 wherein said ignition is the result of an electrical spark from a high voltage igniter in said combustion chamber.

3. A water to fuel production system as in claim 2 wherein said outlet means connect to a chimney means having a lower return connected to said smaller compartment means to return condensed water to said smaller compartment means.

4. A water to fuel production system for providing fuel for steam operated devices and a source of heat comprising:
    a. an electrolysis means including a large container divided into smaller compartments, where at least one partition means separates said compartments and positioned to provide an open space between the bottom of said partition means and said compartment, and a plurality of cathodes and anodes separated by said partition means of said compartments, whereby said cathodes and anodes are connected to a source of electrical current, to produce hydrogen and oxygen gases;
    b. a combustion chamber connected to said electrolysis means to receive and ignite the commingled hydrogen and oxygen gases; and
    c. an outlet means for removing heat and steam.

5. A water to fuel production system as in claim 4 wherein said combustion chamber is connected to said electrolysis means by a hydrogen manifold connected to at least one compartment means containing cathodes to direct hydrogen gas to said combustion chamber, and an oxygen manifold connected to at least one compartment means containing anodes to direct oxygen gas to said combustion chamber.

6. A water to fuel production system as in claim 5 wherein said outlet means connected to said combustion chamber is a steam boiler having heat exchange means surrounded by a water chamber.

7. A water to fuel production system as in claim 6 wherein said hydrogen manifold includes an inverted U-shape conduit to prevent back flashes of burning hydrogen gas.

8. A water to fuel production system as in claim 7 wherein said hydrogen manifold connected to said combustion chamber is surrounded by said oxygen manifold to more completely burn the gases.

9. A water to fuel production system as in claim 8 wherein the ratio of the diameter of the oxygen manifold to hydrogen manifold is 2:1 based on the diameter of the oxygen manifold "d" and the diameter of the hydrogen manifold being $(\sqrt{3})xd$.

* * * * *